United States Patent Office.

RICHARD HUNT AND EDGAR SIDDONS WILSON, OF LIVERPOOL, COUNTY OF LANCASTER, ENGLAND.

PROCESS OF REFINING AND CLARIFYING CRUDE COTTON-SEED OIL.

SPECIFICATION forming part of Letters Patent No. 365,921, dated July 5, 1887.

Application filed April 27, 1887. Serial No. 236,348. (No specimens.) Patented in England February 4, 1887, No. 1,771.

*To all whom it may concern:*

Be it known that we, RICHARD HUNT and EDGAR SIDDONS WILSON, subjects of the Queen of Great Britain, residing at Liverpool, in the county of Lancaster, England, have invented a certain new and useful Improvement in Refining and Clarifying Crude Cotton-Seed Oil, (for which we have applied for British Letters Patent No. 1,771, dated February 4, 1887, and nowhere else;) and we do hereby declare that the following is a full, clear, and exact description of the invention, which will enable others skilled in the art to which it appertains to make and use the same.

The invention relates to the treatment of crude cotton-seed oil—that is, cotton seed oil expressed or obtained from cotton-seeds in any manner in which the oil is discolored and is more or less impure.

The object is to refine and clarify such oil in a simple and efficient manner, so that a greater quantity of pure clear oil may be obtained at less expense and more readily than heretofore.

To carry our invention into effect most advantageously, we proceed in manner following: We mix with the crude oil at a temperature of 140° Fahrenheit two and a half per cent. of a solution of silicate of soda or soluble glass of a strength of 140° Twaddle mixed with five times its bulk of water. The mixture of oil, silicate, and water is agitated for from ten minutes to half an hour, after which it is left at rest until subsidence takes place— say for a period of twenty-four hours. The clear oil is then decanted. The foots or residue, consisting mainly of coloring matter and silicate of soda, is practically free from oil. If less water is used, there will be sufficient oil in the foots to make it desirable to extract the same by heating or pressing.

Instead of silicate of soda, silicate of potash or tungstate of soda may be used, but not so advantageously.

The temperature at which the treatment is conducted may vary from 50° Fahrenheit to 250° Fahrenheit; but the temperature given is the one we have found to answer best in practice. The percentage of silicate or tungstate may also be varied according to the quality of the oil treated, the more impure the oil the greater percentage. For average qualities the percentage given answers well.

When the oil treated as first above set forth is required of light color for soap-making or like purposes, the said oil is bleached by the addition thereto of chloride of lime and sulphuric or hydrochloric acid in the usual manner.

The times allowed for agitation and subsidence may also be varied, as will be obvious.

We claim—

1. An improvement in the art of refining or clarifying crude oil, such as cotton-seed oil, which consists in treating the same with silicate of soda or its equivalent, substantially as and for the purposes described.

2. An improvement in the art of refining or clarifying crude oil, such as cotton-seed oil, which consists in treating the same with silicate of soda or its equivalent, and then treating it with chloride of lime and an acid, substantially as and for the purposes described.

RICHARD HUNT.
EDGAR SIDDONS WILSON.

Witnesses:
JAMES JOHNSON,
W. B. JOHNSON.